United States Patent [19]

Notz et al.

[11] 4,070,438

[45] Jan. 24, 1978

[54] METHOD FOR LOADING RESIN BEDS

[75] Inventors: Karl J. Notz, Oak Ridge; Robert H. Rainey; Charles W. Greene, both of Knoxville; William E. Shockley, Oak Ridge, all of Tenn.

[73] Assignee: The United States of America as represented by the United States Department of Energy, Washington, D.C.

[21] Appl. No.: 725,078

[22] Filed: Sept. 21, 1976

[51] Int. Cl.² .............................. B01J 1/04; B01J 1/08
[52] U.S. Cl. ................................ 423/7; 252/301.1 R; 252/301.1 S
[58] Field of Search ................ 423/6, 7; 252/301.1 R, 252/301.1 S

[56] References Cited
U.S. PATENT DOCUMENTS

| Re. 28,894 | 7/1976 | Kanij et al. | 252/301.1 R |
| 3,171,715 | 3/1965 | Kleinsteuber | 252/301.1 S |
| 3,335,095 | 8/1967 | Moore | 252/301.1 S |
| 3,361,676 | 1/1968 | McBride et al. | 252/301.1 S |
| 3,367,881 | 2/1968 | Morse | 252/301.1 S |
| 3,401,122 | 9/1968 | Gogliati et al. | 252/301.1 S |
| 3,629,133 | 12/1971 | McBride et al. | 252/301.1 S |
| 3,666,426 | 5/1972 | Barkhardt | 252/301.1 S X |
| 3,717,581 | 2/1973 | Nouthout | 252/301.1 S X |
| 3,800,023 | 3/1974 | Haas | 423/256 |
| 3,935,120 | 1/1976 | Kanij et al. | 252/301.1 R |

Primary Examiner—Richard E. Schafer
Attorney, Agent, or Firm—Dean E. Carlson; Stephen D. Hamel; Allen H. Uzzell

[57] ABSTRACT

An improved method of preparing nuclear reactor fuel by carbonizing a uranium loaded cation exchange resin provided by contacting a H+ loaded resin with a uranyl nitrate solution deficient in nitrate, comprises providing the nitrate deficient solution by a method comprising the steps of reacting in a reaction zone maintained between about 145°-200° C, a first aqueous component comprising a uranyl nitrate solution having a boiling point of at least 145° C with a second aqueous component to provide a gaseous phase containing $HNO_3$ and a reaction product comprising an aqueous uranyl nitrate solution deficient in nitrate.

9 Claims, 2 Drawing Figures

METHOD FOR LOADING RESIN BEDS

BACKGROUND OF THE INVENTION

This invention was made in the course of, or under, a contract with the Energy Research and Development Administration. It relates to the art of preparing carbonized resin fuels for nuclear reactors and more specifically to the art of loading cation exchange resins with uranium for subsequent carbonization.

A method of preparing loaded cation exchange resins for the production of nuclear fuels is described in commonly assigned U.S. Pat. No. 3,800,023, to Paul A. Haas, issued Mar. 26, 1974 for "Method For Loading Resin Beads" which is herein incorporated by reference.

It was disclosed in the Haas patent that the equilibrium quotient for the loading of uranium on the resin is inversely proportional to the square of the acidity of the solution. Therefore, the uranium loads more strongly from solutions which are "acid deficient". An acid deficient solution was provided by adding $UO_3$ to a solution of uranyl nitrate, $UO_2(NO_3)_2$, to provide a nitrate-to-uranium mole ratio of less than 2. Our method is an improved method of providing the acid deficient solution of uranyl nitrate for use in loading cation exchange resins. For purposes of this disclosure the terms "acid deficient" and "nitrate deficient" are used synonymously and refer to solutions of uranyl nitrate which have a nitrate-to-uranium ratio of less than 2. The terms "nitrate deficiency" and "acid deficiency" refer to the nitrate-to-uranium mole ratio. Thus the smaller the nitrate-to-uranium ratio, the more acid deficient is the solution.

The extent of uranium loading of cation exchange resins from uranyl nitrate solutions has been shown to depend on the acid deficiency of the solution. The greater the extent of resin loading the more compact and economical is the resulting fuel. Current fuel fabrication proposals call for resin loading to substantially full capacity. As seen from FIG. 1, 95% loading requires an acid deficiency of about 1.7 or less. An acid deficiency of about 1.6 or less is preferred for maximum laoding.

PRIOR ART

In the prior art, acid deficient uranyl nitrate solutions have been provided by solvent extraction of $HNO_3$ from uranyl nitrate solutions by organic amines and by dissolution of solid $UO_3$ in uranyl nitrate solutions (U.S. Pat. No. 3,800,023). Such methods have provided acid deficiencies as low as 1.5 (the theoretical limit). One problem in the prior art process is the requirement for handling dry particulate solids in the preparation and use of $UO_3$ in remote operations. The handling of dry particulate solids is particularly difficult in remote operations. The presence of dry fissionable material presents serious problems of accountability and criticality in nuclear fuel fabrication and reprocessing operations, and should be avoided if at all possible. The extraction of nitric acid by amines involves the possibility of contaminating the uranyl nitrate solution with organic materials and the recovery of the amines results in a $NaNO_3$ or $NH_4NO_3$ waste product which requires expensive waste treatment prior to discharge. Furthermore, the organic materials utilized in the amine process are flammable and are therefore undesirable for use in processing radioactive material.

Other proposals for providing acid deficient solutions include addition of ammonium hydroxide to a uranyl nitrate. The chief problem with this process is that a small amount of $NH_4^+$ ions would load onto the resin and contaminate the fuel. Since nitrogen contaminants transmute into carbon-14 upon irradiation, ammonium salts should also be avoided in resin loading operations. Again, ammonium nitrate wastes would result.

SUMMARY OF THE INVENTION

It is an object of this invention to provide a method for loading a cation exchange resin with uranium which avoids the preparation and handling of dry particulate solids.

It is a further object to provide a method which does not require the use of ammonium salts.

It is a further object to provide a method which does not require the use of organic liquids.

It is a further object to provide a process which produces no nitrate salts as waste materials.

It is a further object to provide a process which yields nitric acid as a reaction product, thereby eliminating the disposal of nitrate salt wastes and providing a product useful for in-plant use such as in the head end dissolution of spent reactor fuels.

These and other objects as will be apparent to those skilled in the art are provided in a process for providing a uranium loaded cation exchange resin comprising contacting a cation exchange resin with an aqueous uranyl nitrate solution deficient in nitrate ions, the improvement comprising providing said nitrate deficient solution by a method comprising the steps of: reacting, in a reaction zone maintained between 145°–200° C, a first aqueous component comprising a uranyl nitrate solution having a boiling point of at least 145° C with a second aqueous component to provide a gaseous phase containing $HNO_3$ and a reaction product comprising an aqueous uranyl nitrate solution deficient in nitrate.

The reaction product comprising an aqueous uranyl nitrate solution deficient in nitrate contains undissolved solids and may be diluted with water to dissolve the solids and then contacted with a cation exchange resin. Alternately, the reaction product may be contacted with sufficient water to prevent freeze-up of the nitrate deficient solution, yet insufficient to completely dissolve undissolved solids, thereby providing a flowable slurry which is suitable for contacting the cation exchange resin to cause uranium ions to load the resin.

DETAILED DESCRIPTION

Figure 1:
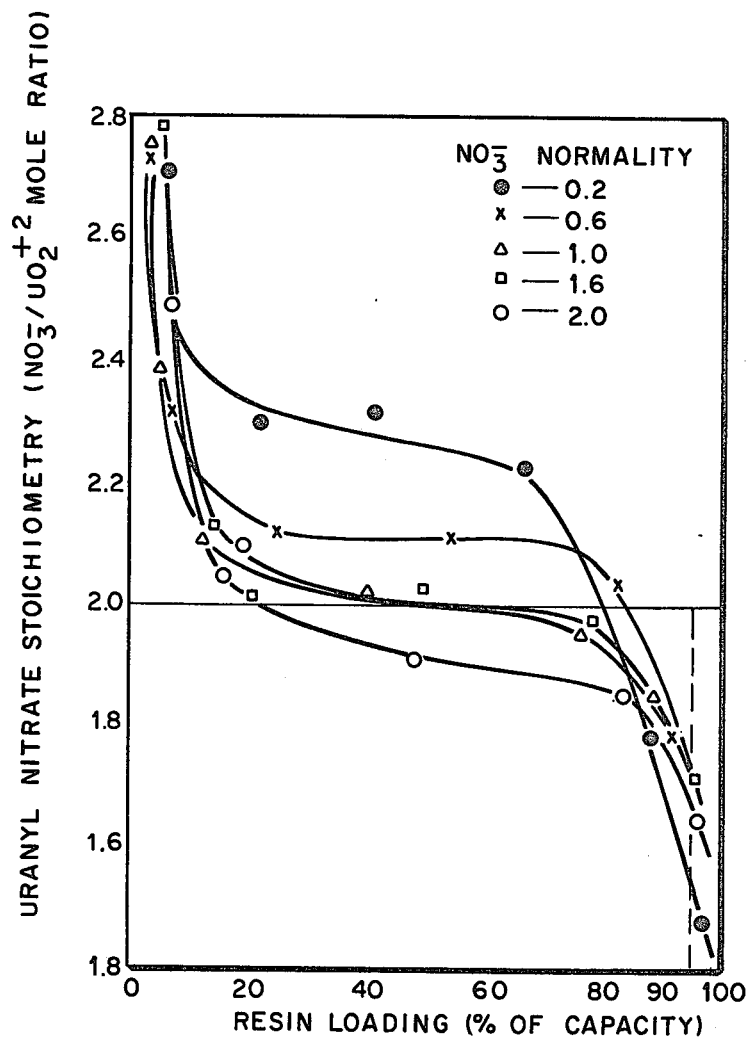
FIG. 1 is a graph showing the dependency of resin loading capacity upon the $NO_3/U$ mole ratio of uranyl nitrate solutions.

According to our invention a solution of uranyl nitrate deficient in nitrate ions is provided by first providing an aqueous uranyl nitrate solution having a boiling point above about 145° C and contacting the solution at a temperature of 145°–200° C with a second aqueous phase less concentrated in uranyl nitrate, whereby $HNO_3$ is evolved in a gaseous phase which might also contain nitrogen oxides, leaving a liquid aqueous phase, which contains some solids and which is deficient in nitrate. While subatmospheric pressures would increase the rate of HNO₃ recovery, the reaction proceeds satisfactorily at atmospheric pressure. We have found that this process is cabable of being carried out on a continuous steady state basis and that solids present in the acid deficient uranyl nitrate product do not interfere in resin loading, but can actually enhance the efficiency of uranium utilization during subsequent resin loading. A distinct advantage in our process is provided when the cation exchange resin is loaded from a flowable slurry rather than from a more dilute acid deficient solution containing no solids. Since uranium utilization per pass is higher with slurry loading, our process would require less recycle of loading solutions, thereby reducing the energy requirement for the evaporation of water from the reaction zone.

While it has been known for some time that uranyl nitrate hexahydrate decomposes to $UO_3$ at temperatures above 180° C [W. Lodding et al. *J. Inorg. Nucl. Chem.* 27 1261 (1965),] it was not known that the decomposition of uranyl nitrate could be carried out in a controllable manner to provide an acid deficient solution suitable for loading cation exchange resins. It was known in the prior art that stoichiometric uranyl nitrate solutions precipitated hydrated $UO_3$ at elevated temperatures. (Marshall et al. "The Solubility of $UO_3$ Hydrates in $HNO_3$—$H_2O$ Solution, 25°–350° C, $10^{-4}$-6 Molal Nitrate", *J. Inorg. Nucl. Chem.*, 1963, 25 pp. 283–290) Since the presence of suspended solids is ordinarily to be avoided in remote nuclear fuel process operation, it was feared that $UO_3$ precipitation would prevent the production of useful acid deficient uranyl nitrate solutions and interfere with subsequent resin loading processes.

We found that acid deficiencies of 1.8 are provided in our reaction product solution with the formation of undissolved solids. While conclusive analytical data is not yet available for these solids, we believe them to be hydrous $UO_3$ and for purposes of this specification, the solids forming in the acid deficient solutions will be referred to as $UO_3$. According to our process, a temperature of at least 145° C is required in the reaction zone, with the first aqueous component having a boiling point of at least 145° C. Below about 145° C, the bulk of nitric acid in the condensate will be excess HNO₃ with only very slight acid deficiency provided without extensive reaction times. When the nitrate uranium ratio decreases below 2.0 in our process $UO_3$ precipitate is observed. Nitrate deficient slurries having liquid phase acid deficiencies as low as 1.8 are obtainable at the temperatures and concentrations of our reaction zone without further addition of dilution water to the reaction product mixture. If desired, the reaction mixture (that is, the acid deficient uranyl nitrate solution containing undissolved $UO_3$) can be diluted whereupon $UO_3$ is dissolved providing a solution of acid deficiency as low as 1.5. Alternately, only sufficient water need be added to prevent the reaction mixture from freezing up thereby providing a flowable slurry. It has been found according to this invention that the flowable slurry can be contacted directly with a cation exchange resin such as in a fluidized bed of a Higgins-type contactor and provide a uranium utilization substantially greater than would be obtained from a uranyl nitrate solution of similar acid deficiency without undissolved $UO_3$. Apparently, as the uranyl ion is loaded onto the resin, $H^+$ ions are released causing the dissolution of solid $UO_3$ thus providing more uranyl ions for loading. Without $UO_3$ present, the resin loading is hindered by reduced uranyl ion concentration as the solution is passed through the column. The undissolved $UO_3$ serves as a continuous source of uranyl ions, dissolving as $H^+$ ions are released from the resin, thereby allowing the more extensive loading of the resin.

While nitrate deficient thorium nitrate solutions have been produced in the prior art by steam stripping nitrate from $Th(NO_3)_4$, [*Nuclear Science and Engineering* 10 367-71 (1961)] there was no danger of solids precipitation in the $Th(NO_3)_4$—$H_2O$ system as in the case of uranyl nitrate solution. Also, only a very small deficiency was needed, a $NO_3$/Th mole ratio of about 3.8. Thorium nitrate is much easier to denitrate than uranyl nitrate.

All that is necessary for providing an aqueous uranyl nitrate solution deficient in nitrate according to our invention is that an aqueous uranyl nitrate solution having a boiling point about 145° C be maintained at a temperature about about 145° C and contacted with an aqueous component which carries off nitric acid. Below 145° C nitrate will not be liberated from the solution in sufficient quantity over practicable time periods to provide nitrate deficiency. If the solution above 145° C is not contacted with an aqueous phase, the solution will become more concentrated in uranyl nitrate as water evaporates, but the temperature will continue to rise and decomposition with loss of nitrate will continue.

The uranyl nitrate solution boiling above 145° C may be provided by concentrating an aqueous uranyl nitrate solution by heating to a temperature of 145° C. The excess water boils away leaving a concentrated solution of uranyl nitrate. Uranyl nitrate solutions suitable for providing feed to our process are typically provided from the reprocessing of irradiated nuclear fuel by various solvent extraction processes such as the Thorex Process more fully described in Long, *Engineering For Nuclear Fuel Reprocessing*, Gordon and Beach (1967). Another method of providing a uranyl nitrate solution having a boiling point above about 145° C is to heat solid uranyl nitrate hexahydrate to above 145° C. At about 110° C, four molecules of water are lost and the uranyl nitrate continues to dissolve in the remaining water. Upon heating to 145° C a very concentrated aqueous solution of uranyl nitrate having a boiling point of 145° C results. The solution actually resembles a molten salt in appearance. According to our process, the uranyl nitrate solution above 145° C is contacted with a second aqueous component. The second aqueous component may be supplied as superheated steam, as liquid water or as an aqueous solution. When the second aqueous phase is supplied as a liquid, steam is formed as it contacts the hot uranyl nitrate solution accompanied by the evolution of nitric acid as a gaseous phase which is easily recovered as a distillate. A preferred method of carrying out our process is to supply the aqueous phase as a recycle uranyl nitrate solution from a previous resin loading step. Of course when the second aqueous component is added as a uranyl nitrate solution, it should be less concentrated in uranyl nitrate than the first aqueous component, and should not have a $NO_3$/U ratio of less than the desired product. By appropriate mass balance, steady state continuous operation of our process is accomplished. The feed materials to our process are fresh cation exchange resin, water and uranyl nitrate which is normally commercially available as a solution. The products are HNO₃ and uranium-loaded cation exchange resin. The reaction zone of our process is maintained at a temperature of 145°–200° C, with 145°–165° less efficient loading may be accomplished in static beds or stirred beds.

The minimum amount of water necessary to provide a flowable slurry is that amount required to keep the product from freezing during transport to the subsequent ion exchange resin loading step and is readily determined by routine experimentation. For slurry loading, the amount of diluent water can range from that amount needed to prevent freezing during transport to just less than that amount which completely dissolves the solids, and in a function of the transport conditions. A good method of controlling the resin loading step is by monitoring the pH and density of the solution entering and leaving the ion exchange contactor to provide an indication of the nitrate and uranium concentrations and is well within the skill of the art.

To demonstrate the loading of cation exchange resin with a slurry of $UO_3$ in acid deficient uranyl nitrate solution the following experimental example is presented.

EXAMPLE III

The resin loading was accomplished in a laboratory-scale pulsed Higgins type contactor comprising a resin reservoir disposed above the right end of a U-shaped 1 in. column. Pulse water is introduced through a valve at a point just below the resin reservoir to advance resin through the column. The uranium solution containing solids is introduced through a valve on the left leg of the column at a position below the end and flow through the column and effluent is removed on the right leg. Wash water is continuously introduced into the left leg above the uranium solution entrance point. Periodically a water pulse is introduced in the right leg countercurrent to the loading solution to cause loaded resin to be discharged from the top of the left leg of the U-column. In this manner, resin exposed to the initial concentration of uranium solution and loaded to near capacity is recovered as the resin product.

The effective loading length of the 1 in. diameter laboratory column was 6 ft. It was desired to load at a rate of 100 g. U/hr. which is equivalent to 120 kg. U/day in a 5 inch diameter column with 12 ft. of effective loading length. Since the resin in the $H^+$ form (provided by contacting as-received Amberlite IRC-72 with dilute $HNO_3$) has a U capacity of 400 g./l. the corresponding resin pulse rate in the lab column is 250 ml/hr. to give a residence time of almost 4 hours. Before starting the test run, an acid deficient uranyl nitrate solution (no solids) was passed through the column to simulate steady state conditions. Start-up of the column differs from steady state only in that the resin is not pulsed for two hours in order to allow the front to load before pulsing it out of the column. To simulate the ion exchange feed from a slurry produced by our process, a feed suspension was made up by stirring $UO_3$ hydrate with about 1.1 M uranyl nitrate solution over night at ambient temperature. The total $NO_3/U$ mole ratio was 1.42. After stirring about one half of the $UO_3$ had dissolved to provide a uranyl nitrate solution about 1.3 M in U with a $NO_3/U$ mole ratio of about 1.7, and contain a suspension of $UO_3$, about 0.2 M. The feed was stirred continuously to maintain the $UO_3$ suspended. The column was warmed to about 50° C to accelerate the loading reaction. The higher temperature also accelerates the dissolution of $UO_3$. The slurry feed was introduced at 14–17 ml/min. and wash water was fed at 24–40 ml/min. Resin was pulsed at 300–330 ml/hr. Uranium utilization was about 37%, somewhat higher than a value of 31% obtained previously with acid deficient uranyl nitrate solutions ($NO_3/U$ mole ratio of about 1.5) containing no solids. The effluent from the contactor for the slurry run had a $NO_3/U$ mole ratio of about 2.36, reflecting the higher uranium utilization. The discharged resin was dried and analyzed and found to be loaded to substantially complete uranium saturation (47 ± 0.5 wt. %) corresponding to that obtained by other loading processes using acid deficient solution $NO_3/U$ ratio of 1.5 and no undissolved solids. According to the data in FIG. 1 only about 95% loading would be expected. The effluent for this experimental example was clear, containing no suspended solids since $H^{30}$ released during resin loading will redissolve any $UO_3$ present.

It has been found that when cation exchange resins are loaded from an acid deficient uranyl nitrate system containing suspended solids comprising $UO_3$ (a hydrous species thereof) that substantially complete loading is achieved at temperatures of about 40°–100° C. It is believed that at these temperatures, solids present in the ion exchange bed are more soluble, hence more complete loading is achieved than would be attainable based on the $NO_3/U$ mole ratio of the feed liquor.

A second run at higher flow rates demonstrated than even if $UO_3$ solids broke through into the effluent, there was no adverse effect. The resin product showed a normal U content of 47.07 wt. % U. In each run, only very small amount of solid $UO_3$ were carried over into the resin product, less than 0.63 g/l. These small amounts are easily removed by subsequent water washing of the product. It is therefore seen that cation exchange resins can be loaded with uranium from an acid deficient uranyl nitrate solution from a flowable slurry as provided by our process when solids are not completely dissolved prior to the ion exchange step. The preferred resin loading temperature is about 40°–60° C.

The resins suitable for loading uranium ions according to our process include both strong acid and weak acid resins. Strong acid resins are typically sulfonated copolymers of polystyrene and divinyl benzene. Weak acid resins are typically copolymers of polystyrene and acrylic or methacrylic acid. The preferred resins for preparation of nuclear reactor fuels are weak acid resins (containing carboxyl groups) rather than strong acid resins which cause sulfur contamination. The preferred resin is an acrylic acid-divinyl benzene copolymer having a carboxylic acid functional group and a moisture content of 71-73 wt. %. Such a resin is available from Rohm and Haas Company and is marketed under the name of AMBERLITE IRC-72. While the preferred method of carrying out our process is with a continuously loading process as in Example III, our process may also be carried out as a batch process by removing the entire contents of the steam stripper (reaction zone) and diluting to provide a flowable slurry or homogenous solution for contacting the ion exchange resin. Actually, acid deficient solutions are not required for loading strong acid resins, so the primary use of our invention is in loading carboxylic acid resins (weak-acid resins).

What is claimed is:

1. In a method for providing a uranium loaded cation exchange resin comprising contacting a cation exchange resin with an aqueous uranyl nitrate solution deficient in nitrate ions, the improvement comprising providing said solution deficient in nitrate ions by a method comprising the steps of:

C preferred. Of course, if very short residence times are provided, higher temperatures might be employed and such conditions are considered to be within the scope of our inventive concept.

For purposes of demonstrating our method, the following experimental examples are presented.

EXAMPLE I 250 ml. of uranyl nitrate (2.27 M in $UO_2(NO_3)_2$ and 0.80 M in $HNO_3$) was boiled in a distillation flask equipped with a condenser, a means of continuously adding solution near the bottom of the solution in the bottom of the flask, an electric heating source and two thermometers for measuring the temperature of the liquid and gas phase. Additional uranyl nitrate solution was added to the distillation flask at the same rate that distillate was collected so that the volume of the solution in the flask remained constant. Addition was continued until the temperature of the liquid in the flask reacted 140° C and then water was added to the flask, evaporated and collected at an appropriate rate to maintain the liquid in the flask at the constant temperature. The experiment was continued until the volume of condensate collected (after water was introduced) was equal to twice that of the solution in the flask. At the end of the experiment, the heat was turned off and water was added to the flask until the temperature reached approximately 105° C. The solution was then removed from the flask and diluted to a known volume. If water is not added to the contents of the flask during the initial cooling period, the contents of the flask solidify. The product had a $NO_3/U$ mole ratio of 2.00. The free acid was removed into the distillate but nitrate was not removed from the uranyl nitrate at this temperature.

EXAMPLE II

In the same equipment set-up as Example I, about 500 g of uranyl nitrate hexahydrate crystals were added to the distillation flask. Heat was provided by a temperature controlled oil bath and was applied to melt the salt. Water was removed by distillation until the temperature reached about 150° C. While maintaining the temperature at 150° C, a solution of uranyl nitrate (0.240 M U and 0.54 M $NO_3$ for a $NO_3/U$ mole ratio of 2.20, simulating recycle effluent from a cation exchange sorbtion step) was then continuously added to the distillation flask through a tube which went to near the bottom of the molten salt. This solution boiled immediately. The escaping steam and a small amount of acid was continuously condensed and titrated to determine the acid concentration. Over a 30 hour run there was no difficulty in the control of the system. The temperature was maintained at 153± 1° C and the flow rate of the feed and the distillate were 33± 3 ml/hr. The distillate was about 0.2 M $HNO_3$ for the first 10 hours, rose to 0.3 M $HNO_3$ for about 5 hours and then decreased to about 0.15 M $NO_3$ during the last 5 hours. At the end of the experiment the distillate contained about 24% as much nitrate as was in the feed, indicating that the product would have an overall $NO_3/U$ mole ratio of 1.76. As the solution became acid deficient, a solid precipitate developed in the distillation flask. The volume of the precipitate increased continuously as the acid was removed. The precipitate dissolved almost completely when water was added, except for iron oxide formed from impurities originally present in the feed.

Figure 2:
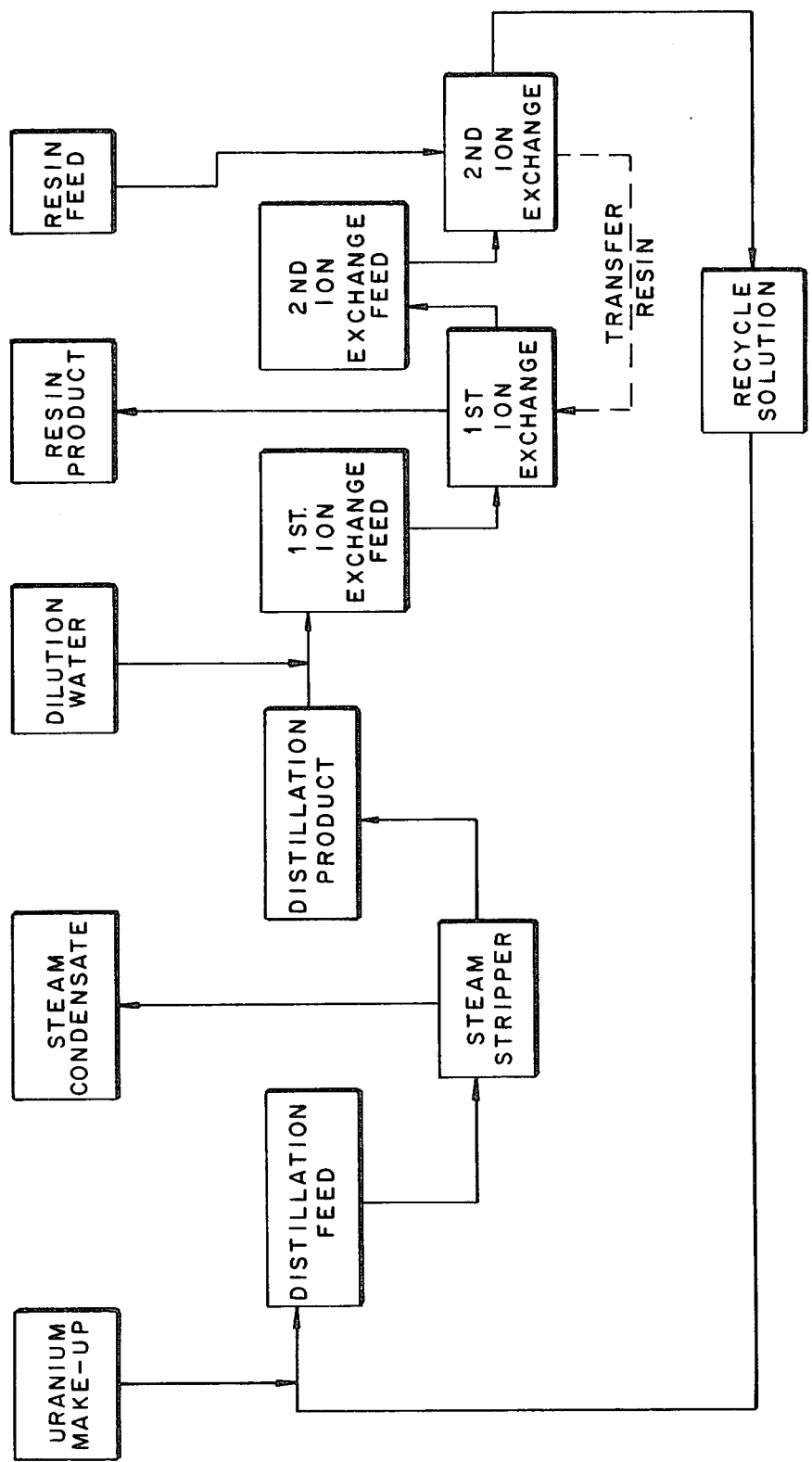
FIG. 2 is a block diagram showing an embodiment of a two stage batch resin loading process according to our invention.

FIG. 2 represents a block diagram flow sheet for continuous operation. Uranium make-up is added as 0.027 l./hr. of 2.0 M UNH in water to a recycle solution (0.246 M U, 0.54 M $HNO_3$ at 1 l./hr.) to provide a distillation feed of 1.027 l./hr 0.292 M in uranium and 0.621 M in nitrate, to provide $NO_3/U$ mole ratio of 2.17. The distillation feed is fed to the reaction zone (steam stripper) where it contacts a boiling solution of uranyl nitrate at 155° C at atmospheric pressure. In order for $HNO_3$ to be stripped from the boiling uranyl nitrate solution the distillation feed must be more dilute in uranyl nitrate than the boiling solution. When the distillation feed contacts the boiling solution, $HNO_3$ is evolved as a gaseous phase leaving uranyl nitrate solution deficient in nitrate ions. The distillate is recovered as 0.97 l./hr. of 0.111 M $HNO_3$. The distillation product is a concentrated nitrate deficient uranyl nitrate solution containing solids and the reaction product. It is a uranyl nitrate solution 6.0 M in U and 10.8 M in $NO_3$ for a $NO_3/U$ mole ratio of 1.8 and is recovered at a rate of 0.05 l./hr. The reaction product is withdrawn at a rate sufficient to maintain a constant volume of reactants in the reaction zone. Under these conditions, the contents of the reaction zone therefore consist of an aqueous uranyl nitrate solution having a boiling point of 155° C. The distillation product is diluted with 0.95 l./hr. of water to provide a first ion exchange feed of 1.00 l./hr, 0.30 M in U, 0.54 M in $NO_3$, having a $NO_3/U$ mole ratio of 1.8. The temperature of the ion exchange feed is not critical to the loading process when the reaction product is first diluted with water to completely dissolve solids. The temperature can be at room temperature or up to about 100° C. The first ion exchange feed is then contacted with a $H^+$ loaded cation exchange resin (provided by contacting the as-received resin with dilute $HNO_3$) in a conventional ion exchange column causing uranium ions to load the resin. The effluent of the first ion exchange is 1.00 l./hr. of uranyl nitrate, 0.27 M in U, 0.54 M in $NO_3/U$ mole ratio of 2.00, and makes up a second ion exchange feed. The second ion exchange feed is contacted with a similar cation exchange resin as the first feed and the resin contacted in the second ion exchange step is transferred to the first ion exchange step. The effluent from the second ion exchange step is 1.00 l./hr. of a uranyl nitrate solution 0.246 M in U, 0.54 M in $NO_3$ with a $NO_3/U$ ratio of 2.20. The effluent solution is the recycle solution and is combined with make-up uranyl nitrate solution to provide the distillation feed. As seen, the method of our invention is readily adaptable to using "acid rich" uranyl nitrate solutions ($NO_3/U$ mole ratios greater than 2) to make up the feed for the steam stripper reaction. At start up of the process, the initial uranyl nitrate solution was provided by heating uranyl nitrate hexahydrate (UNH) crystals to 155° C. The flow rates of the distillation feed and distillation product are regulated to maintain a constant volume of concentrated uranyl nitrate salt boiling within the reaction zone.

An alternate way of operating our process according to FIG. 2 is to reduce the quantity of dilution water to only that required to make the distillation product readily flowable as a slurry. This would correspondingly reduce the amount of water throughout the system.

Since solids are maintained within the reaction product during contact with the cation exchange resin, the resin contacting step should preferably be carried out in fluidized beds or in a continuous (Higgins) loading contractor more fully described in U.S. Pat. Nos. 2,815,322 (1954) and 3,580,842 (1968) to I. R. Higgins. However, reacting in a reaction zone maintained between about 145° 14 200° C, a first aqueous component comprising a uranyl nitrate solution having a boiling point of at least 145° C with a second aqueous component to provide a gaseous phase containing HNO$_3$ and a reaction product comprising an aqueous uranyl nitrate solution deficient in nitrate ion and containing a solid phase.

2. The method of claim 1 wherein said first aqueous component is provided by evaporating a uranyl nitrate solution to provide a more concentrated uranyl nitrate solution.

3. The method of claim 1 wherein said first aqueous component is provided by heating uranyl nitrate hexahydrate to a temperature of at least 145° C.

4. The method of claim 1 wherein said second aqueous component is steam.

5. The method of claim 1 wherein said second aqueous phase is uranyl nitrate solution less concentrated in uranium than the first aqueous component having a NO$_3$/U mole ratio greater than the reaction product.

6. The method of claim 1 wherein said solution containing said solid phase is contacted with sufficient water to dissolve said UO$_3$ and further comprising contacting the resulting solution with said cation exchange resin.

7. The method of claim 1 wherein said solution containing said solid phase is contacted with an amount of water sufficient to prevent freezing of said nitrate deficient solution containing UO$_3$ thereby providing a flowable slurry comprising solid UO$_3$ in a nitrate deficient uranyl nitrate solution, and further comprising contacting said flowable slurry with said cation exchange resin.

8. A continuous process for providing a cation exchange resin loaded with uranium ions comprising the steps of:

a. in a reaction zone maintained between about 145°–200° C, contacting a first aqueous uranyl nitrate solution having a boiling point of at least about 145° C with a distillation feed comprising a second uranyl nitrate solution more dilute than the first solution to provide a gaseous phase containing HNO$_3$ and an aqueous uranyl nitrate product solution deficient in nitrate ion and containing a solid phase;

b. recovering HNO$_3$ from said gaseous phase;

c. withdrawing said product solution from said reaction zone at a rate sufficient to maintain a constant volume of reactants within said reaction zone;

d. contacting said product with at least sufficient water to provide a flowable slurry thereby providing an ion exchange feed;

e. contacting said ion exchange feed with a cation exchange resin to provide a cation exchange resin loaded with uranium ions and an ion exchange effluent solution comprising a uranyl nitrate solution having a NO$_3$/U mole ratio greater than said ion exchange feed solution;

f. combining said ion exchange effluent solution with make-up uranyl nitrate solution to provide said distillation feed, said distillation feed having a NO$_3$./U mole ratio greater than said product solution deficient in nitrate.

9. The process of claim 8 wherein in step d. said product is contacted with insufficient water to completely dissolve solids present in said uranyl nitrate product solution, thereby providing a flowable slurry ion exchange feed.

* * * * *

UNITED STATES PATENT OFFICE
CERTIFICATE OF CORRECTION

Patent No. 4,070,438    Dated Jan. 24, 1978

Inventor(s) Karl J. Notz, Robert H. Rainey, Charles W. Greene, William E. Shockley It is certified that error appears in the above-identified patent and that said Letters Patent are hereby corrected as shown below:

Column 1, line 44, "laoding" should read --loading--
Column 6, line 37, "in $NO_3/U$" should read --in $NO_3$ for a $NO_3/U$--
Column 8, line 14, "$H^{30}$" should read --$H^+$--
Column 8, line 25, "than" should read --that--
Column 8, line 29, "amount" should read --amounts--
Column 9, line 2, "145°14 200°" should read --145°-200°--

Signed and Sealed this

Twenty-seventh Day of June 1978

[SEAL]

Attest:

RUTH C. MASON
Attesting Officer

DONALD W. BANNER
Commissioner of Patents and Trademarks